(12) United States Patent
Bergström et al.

(10) Patent No.: US 10,602,405 B2
(45) Date of Patent: Mar. 24, 2020

(54) METHOD AND APPARATUS FOR CONTROLLING THE OPERATION OF A TERMINAL DEVICE

(71) Applicant: GUANGDONG OPPO MOBILE TELECOMMUNICATIONS CORP., LTD., Dongguan, Guangdong (CN)

(72) Inventors: Mattias Tan Bergström, Stockholm (SE); Henrik Enbuske, Stockholm (SE)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 16/446,834

(22) Filed: Jun. 20, 2019

(65) Prior Publication Data
US 2019/0306751 A1    Oct. 3, 2019

Related U.S. Application Data

(63) Continuation of application No. 15/327,943, filed as application No. PCT/SE2015/050643 on Jun. 3, 2015, now Pat. No. 10,375,603.
(Continued)

(51) Int. Cl.
*H04W 28/08* (2009.01)
*H04W 24/02* (2009.01)
(Continued)

(52) U.S. Cl.
CPC ............ *H04W 28/08* (2013.01); *H04W 24/02* (2013.01); *H04W 48/06* (2013.01); *H04W 48/18* (2013.01); *H04W 88/06* (2013.01)

(58) Field of Classification Search
CPC ..... H04W 28/08; H04W 48/18; H04W 48/06; H04W 24/02; H04W 88/06
See application file for complete search history.

(56) References Cited

U.S. PATENT DOCUMENTS

| 10,375,603 B2 * | 8/2019 | Bergstrom | ............ H04W 88/06 |
| 2011/0130693 A1 * | 6/2011 | Avery | .................... A61F 5/3723 602/20 |

(Continued)

FOREIGN PATENT DOCUMENTS

| EP | 2849486 A2 | 3/2015 |
| WO | WO-2013127480 A1 | 9/2013 |

(Continued)

OTHER PUBLICATIONS

Ericsson, "R2-142366: Introduction of WLAN/3GPP Radio interworking," 3rd Generation Partnership Project (3GPP), TSG-RAN2 Meeting #86, Change Request 36.304, Version 12.0.0, Mar. 19-23, 2014, 6 pages, Seoul, South Korea.

(Continued)

*Primary Examiner* — Mohammad S Anwar
(74) *Attorney, Agent, or Firm* — Finnegan, Henderson, Farabow, Garrett & Dunner LLP

(57) ABSTRACT

According to one aspect there is provided a method in an apparatus in a first network operating according to a first radio access technology, RAT, the method comprising evaluating (101) parameters and/or rules for a terminal device as part of an access network selection, traffic steering and/or traffic aggregation procedure between the first network and a second network operating according to a second RAT; starting (103) a timer if the parameters and/or rules are satisfied; and adjusting (105) the operation of the timer in the event that a change or potential change to the parameters and/or rules occurs prior to expiry of the timer.

20 Claims, 6 Drawing Sheets

111 — Sending an indication to a second apparatus in the first network, the indication indicating the way in which the operation of a timer is to be adjusted in the event that a change or potential change to parameters and/or rules occurs prior to expiry of the timer, wherein the parameters and/or rules are evaluated for a terminal device by the second apparatus as part of an access network selection, traffic steering and/or traffic aggregation procedure between a first network operating according to a first RAT and a second network operating according to a second RAT

Related U.S. Application Data

(60) Provisional application No. 62/038,655, filed on Aug. 18, 2014.

(51) Int. Cl.
*H04W 88/06* (2009.01)
*H04W 48/06* (2009.01)
*H04W 48/18* (2009.01)

(56) References Cited

U.S. PATENT DOCUMENTS

| | | | |
|---|---|---|---|
| 2011/0206012 A1* | 8/2011 | Youn | H04W 36/30 370/332 |
| 2012/0214489 A1 | 8/2012 | Koo et al. | |
| 2013/0109394 A1 | 5/2013 | Rangaiah et al. | |
| 2015/0215812 A1* | 7/2015 | Ye | H04W 36/22 455/437 |

FOREIGN PATENT DOCUMENTS

| | | |
|---|---|---|
| WO | WO-2014036695 A1 | 3/2014 |
| WO | WO-2014111156 A1 | 7/2014 |
| WO | WO-2014112826 A1 | 7/2014 |
| WO | WO-2014113023 A1 | 7/2014 |
| WO | WO-2014168427 A1 | 10/2014 |
| WO | WO-2015003125 A2 | 1/2015 |
| WO | WO-2015138097 A2 | 9/2015 |
| WO | WO-2015153358 A1 | 10/2015 |
| WO | WO-2015171320 A1 | 11/2015 |

OTHER PUBLICATIONS

Huawei et al., "R2-150087: UE behaviour at WLAN parameters change," 3rd Generation Partnership Project (3GPP), TSG-RAN WG2 Meeting Ad-Hoc, Jan. 14-15, 2015, 3 pages, Turin, Italy.

Huawei et al., "R2-150088: UE behaviour at WLAN parameters change," 3rd Generation Partnership Project (3GPP), TSG-RAN WG2 Meeting Ad-Hoc, Change Request 36.331, Version 12.4.1, Jan. 14-15, 2015, 3 pages, Turin, Italy.

Intel Corporation, "R2-143183: Open issues of WLAN/3GPP radio interworking," 3rd Generation Partnership Project (3GPP), TSG-RAN2 Meeting #87, Aug. 18-22, 2014, 6 pages, Dresden, Germany.

European Search Report for European Patent Application No. 15833233.8, dated Jul. 17, 2017, 6 pages.

International Preliminary Report on Patentability for International Patent Application No. PCT/SE2015/050643, dated Mar. 2, 2017, 11 pages.

Author Unknown, "Technical Specification Group Services and System Aspects; Architecture enhancements for non-3GPP accesses (Release 12)," Technical Specification 23.402, Version 12.5.0, 3GPP Organizational Partners, Jun. 2014, 291 pages.

Author Unknown, "Technical Specification Group Core Network and Terminals; Access Network Discovery and Selection Function (ANDSF) Management Object (MO) (Release 12)," Technical Specification 24.312, Version 12.5.0, 3GPP Organizational Partners, Jun. 2014, 296 pages.

Author Unknown, "Technical Specification Group Radio Access Network; Universal Terrestrial Radio Access Network (UTRAN); General description; Stage 2 (Release 12)," Technical Specification 25.300, Version 12.1.0, 3GPP Organizational Partners, Jun. 2014, 7 pages.

Author Unknown, "Technical Specification Group Radio Access Network; User Equipment (UE) procedures in idle mode and procedures for cell reselection in connected mode (Release 12)," Technical Specification 25.304, Version 12.2.0, 3GPP Organizational Partners, Jun. 2014, 56 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 Release 12," Technical Specification 36.300, Version 12.2.0, 3GPP Organizational Partners, Jun. 2014, 215 pages.

Author Unknown, "Technical Specification Group Radio Access Network; Evolved Universal Terrestrial Radio Access (E-UTRA); User Equipment (UE) procedures in idle mode (Release 12)," Technical Specification 36.304, Version 12.1.0, 3GPP Organizational Partners, Jun. 2014, 35 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.2.0, 3GPP Organizational Partners, Jun. 2014, 365 pages.

International Search Report and Written Opinion for International Patent Application No. PCT/SE2015/050643, dated Dec. 10, 2015, 15 pages.

\* cited by examiner

METHOD AND APPARATUS FOR CONTROLLING THE OPERATION OF A TERMINAL DEVICE

CROSS-REFERENCE TO RELATED APPLICATIONS

This application is a continuation of U.S. patent application Ser. No. 15/327,943, filed Jan. 20, 2017, which is a U.S. National Phase entry under 35 U.S.C. § 371 from PCT International Application No. PCT/SE2015/050643, filed Jun. 3, 2015, which claims benefit of priority to Provisional Application No. 62/038,655, filed Aug. 18, 2014, all of which are incorporated herein by reference.

TECHNICAL FIELD

The present disclosure generally relates to terminal devices that support multiple radio access technologies, RATs, and more particularly relates to controlling the operation of terminal devices with respect to radio access networks, RANs, operating according to different RATs.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). As currently specified, Wi-Fi systems are primarily operated in the 2.4 GHz or 5 GHz bands.

Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks. There is interest around using the Wi-Fi technology as an extension, or alternative to cellular radio access network technologies to handle the always increasing wireless bandwidth demands. The term "operator-controlled Wi-Fi" points to a Wi-Fi deployment that on some level is integrated with a cellular network operator's existing network and where the 3GPP radio access networks and the Wi-Fi wireless access may even be connected to the same core network and provide the same services.

However, most current Wi-Fi/WLAN deployments are totally separate from mobile cellular communication networks, and can be seen as non-integrated from the terminal device's perspective. Most operating systems (OSs) for terminal devices such as Android™ and iOS®, support a simple Wi-Fi offloading mechanism where a user equipment, UE (the term used to refer to terminal devices by 3GPP) immediately switches all its Internet Protocol (IP) traffic or Packet-Switched (PS) bearers to a Wi-Fi network upon a detection of a suitable network with a received signal strength above a certain level. Henceforth, the decision to offload to a Wi-Fi or not is referred to as access network selection and/or traffic steering and the term "Wi-Fi-if-coverage" is used to refer to the aforementioned strategy of selecting Wi-Fi whenever such a network is detected.

There are several drawbacks of the "Wi-Fi-if-coverage" strategy, which has led to intense activity in the area of operator-controlled Wi-Fi in several standardization organizations. In 3GPP, activities to connect Wi-Fi access points to the 3GPP-specified core network are pursued, and in Wi-Fi alliance, WFA, activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply for coverage.

Furthermore, 3GPP has agreed to specify a feature/mechanism for WLAN/3GPP Radio interworking which improves operator control with respect to how a UE performs access selection and/or traffic steering between 3GPP and WLANs belonging to the operator or its partners (it may even be so that the mechanism can be used for other, non-operator, WLANs as well, even though this is not the main target), and it is expected that the mechanism will be included in Release 12 of the 3GPP specifications for LTE.

In the mechanism, parameters and/or rules are evaluated for one or both of the 3GPP network and WLAN to determine if a terminal device that is currently using the 3GPP network should access and/or steer traffic to the WLAN and vice versa. According to the mechanism the parameters and/or rules must be satisfied for a certain time period before the terminal device accesses and/or steers traffic to a different network. The certain time period is monitored using a timer which is started when the parameters and/or rules are first satisfied. This timer is also referred to herein as a time-to-trigger timer, since it indicates for how long the parameters and/or rules have to be satisfied before the change in access network or traffic steering is triggered. One reason for the use of the timer is to avoid a terminal device from 'ping-ponging' between the 3GPP network and WLAN.

SUMMARY

Thus, when the parameters and/or rules are met for a terminal device to access or steer traffic to a network operating according to another RAT, the timer is activated and provided that the parameters and/or rules are still met when the timer expires, the terminal device accesses or steers traffic to the other network.

However, a problem exists with the use of the timer in that it is possible for the parameters and/or rules to change or be updated while the timer is running. If the timer is allowed to continue running, it may be that the terminal device executes the change in access network or traffic steering earlier than configured by the network. For example, if the time to trigger is configured to be five seconds and the conditions for steering have been fulfilled for four seconds when the terminal device receives a new threshold and/or condition configuration from the network, the terminal device would execute the change in access network or steering one second after receiving the new configuration, even though the network would expect (and probably want) the terminal device to apply a full five second timer duration when evaluating the new parameters and/or rules. This use of the timer may result in ping-ponging which impairs user experience due to interruptions, increases signalling overhead, and also leads to UE behaviour that is not expected by the network.

Therefore, there is a need for an improved technique for controlling the operation of a terminal device with respect to networks operating according to different RATs.

According to a first aspect, there is provided a method in an apparatus in a first network operating according to a first radio access technology, RAT, the method comprising evaluating parameters and/or rules for a terminal device as part of an access network selection, traffic steering and/or traffic aggregation procedure between the first network and a second network operating according to a second RAT; starting a timer if the parameters and/or rules are satisfied; and adjusting the operation of the timer in the event that a change or potential change to the parameters and/or rules occurs prior to expiry of the timer.

According to a second aspect, there is provided a computer program product comprising a computer readable medium having computer readable code embodied therein, the computer readable code being configured such that, on execution by a suitable computer or processor, the computer or processor is caused to perform the method described above.

According to a third aspect, there is provided an apparatus for use in a first network operating according to a first radio access technology, RAT, the apparatus being adapted to evaluate parameters and/or rules for a terminal device as part of an access network selection, traffic steering and/or traffic aggregation procedure between the first network and a second network operating according to a second RAT; start a timer if the parameters and/or rules are satisfied; and adjust the operation of the timer in the event that a change or potential change to the parameters and/or rules occurs prior to expiry of the timer.

According to a fourth aspect, there is provided a method in a first apparatus in a first network operating according to a first radio access technology, RAT, the method comprising sending an indication to a second apparatus in the first network, the indication indicating the way in which the operation of a timer is to be adjusted in the event that a change or potential change to parameters and/or rules occurs prior to expiry of the timer, wherein the parameters and/or rules are evaluated by the second apparatus for a terminal device as part of an access network selection, traffic steering and/or traffic aggregation procedure between the first network and a second network operating according to a second RAT.

According to a fifth aspect, there is provided a computer program product comprising a computer readable medium having computer readable code embodied therein, the computer readable code being configured such that, on execution by a suitable computer or processor, the computer or processor is caused to perform the method described above.

According to a sixth aspect, there is provided a first apparatus for use in a first network operating according to a first radio access technology, RAT, the first apparatus being adapted to send an indication to a second apparatus in the first network, the indication indicating the way in which the operation of a timer is to be adjusted in the event that a change or potential change to parameters and/or rules occurs prior to expiry of the timer, wherein the parameters and/or rules are evaluated by the second apparatus for a terminal device as part of an access network selection, traffic steering and/or traffic aggregation procedure between the first network and a second network operating according to a second RAT.

According to a seventh aspect, there is provided an apparatus for use in a first network operating according to a first radio access technology, RAT, the apparatus comprising an evaluation module evaluating parameters and/or rules for a terminal device as part of an access network selection, traffic steering and/or traffic aggregation procedure between the first network and a second network operating according to a second RAT; a starting module for starting a timer if the parameters and/or rules are satisfied; and an adjusting module for adjusting the operation of the timer in the event that a change or potential change to the parameters and/or rules occurs prior to expiry of the timer.

According to an eighth aspect, there is provided a first apparatus for use in a first network operating according to a first radio access technology, RAT, the first apparatus comprising a sending module for sending an indication to a second apparatus in the first network, the indication indicating the way in which the operation of a timer is to be adjusted in the event that a change or potential change to parameters and/or rules occurs prior to expiry of the timer, wherein the parameters and/or rules are evaluated by the second apparatus for a terminal device as part of an access network selection, traffic steering and/or traffic aggregation procedure between the first network and a second network operating according to a second RAT.

According to a ninth aspect, there is provided an apparatus for use in a first network operating according to a first radio access technology, RAT, the apparatus comprising a processor and a memory, said memory containing instructions executable by said processor whereby said apparatus is operative to: evaluate parameters and/or rules for a terminal device as part of an access network selection, traffic steering and/or traffic aggregation procedure between the first network and a second network operating according to a second RAT; start a timer if the parameters and/or rules are satisfied; and adjust the operation of the timer in the event that a change or potential change to the parameters and/or rules occurs prior to expiry of the timer.

According to a tenth aspect, there is provided a first apparatus for use in a first network operating according to a first radio access technology, RAT, the first apparatus comprising a processor and a memory, said memory containing instructions executable by said processor whereby said apparatus is operative to: send an indication to a second apparatus in the first network, the indication indicating the way in which the operation of a timer is to be adjusted in the event that a change or potential change to parameters and/or rules occurs prior to expiry of the timer, wherein the parameters and/or rules are evaluated by the second apparatus for a terminal device as part of an access network selection, traffic steering and/or traffic aggregation procedure between the first network and a second network operating according to a second RAT.

Various specific and exemplary embodiments of the above aspects are described in more detail below.

BRIEF DESCRIPTION OF THE DRAWINGS

Exemplary embodiments of the techniques introduced in this document are described below with reference to the following figures, in which.

DETAILED DESCRIPTION

Figure 1:
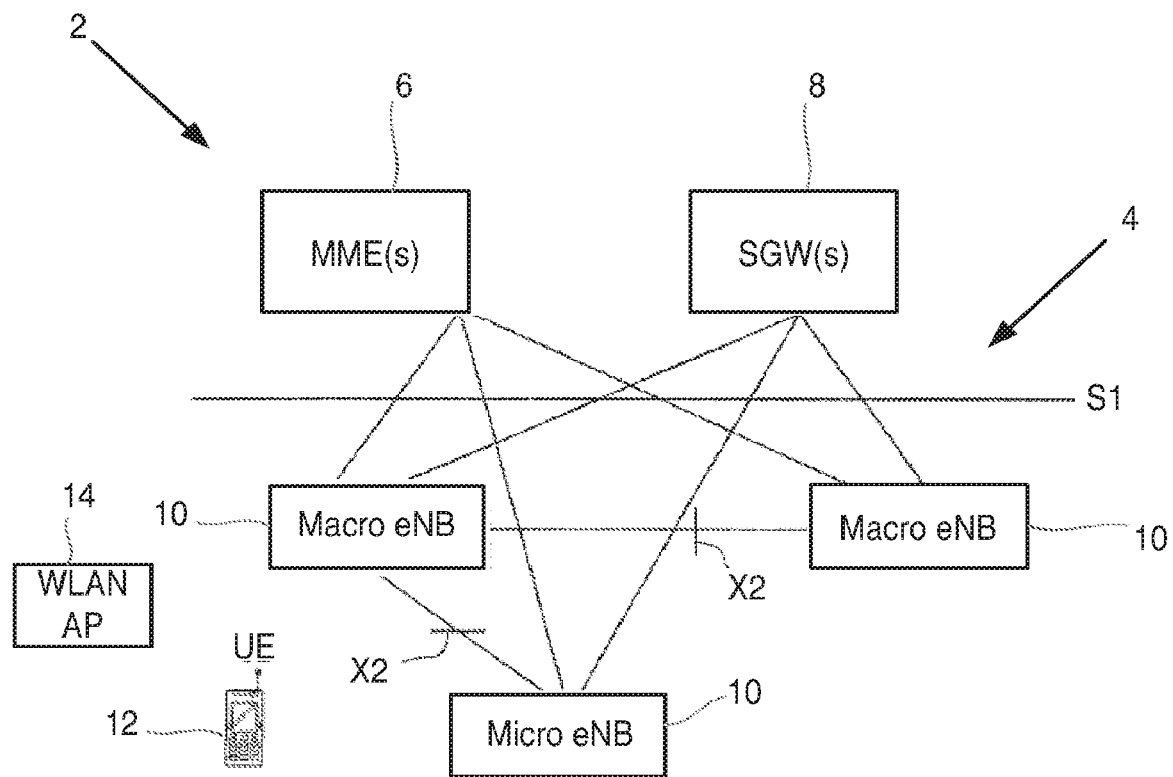
FIG. 1 is a non-limiting example block diagram of an LTE cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor and also in some cases a receiver component and/or transmitter component to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, the terms "processor", "processing unit", "processing module" or "controller" also refer to other hardware capable of performing such functions and/or executing software, such as the example hardware recited above.

Although the description is given for a terminal device or user equipment (UE), it should be understood by the skilled in the art that "terminal device" and "UE" are non-limiting terms comprising any mobile, non-mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE" and "terminal device", the term "mobile device" is used interchangeably in the following description, and it will be appreciated that such a device does not necessarily have to be mobile in the sense that it is carried by a user. Instead, the term "mobile device", as with "terminal device" encompasses any device that is capable of communicating with communication networks that operate according to one or more mobile communication standards, such as GSM, UMTS, LTE, etc.

A cell is associated with a radio access network (RAN) node, where a RAN node comprises in a general sense any node transmitting radio signals in the downlink (DL) to a terminal device and/or receiving radio signals in the uplink (UL) from a terminal device. Some example RAN nodes, or terms used for describing RAN nodes, are base station, eNodeB, eNB, NodeB, macro/micro/pico/femto radio base station, home eNodeB (also known as femto base station), relay, repeater, sensor, transmitting-only radio nodes or receiving-only radio nodes. A RAN node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band circuitry for different RATs.

It should be noted that unless otherwise indicated, the use of the general term "network node" as used herein refers to a RAN node, such as a base station, an eNodeB, a network node in the RAN responsible for resource management, such as a radio network controller (RNC), a core network node, such as a mobility management entity (MME) or SGW, or a WLAN Access Point (AP).

The signalling described is either via direct links or logical links (e.g. via higher layer protocols and/or via one or more network nodes). For example, signalling from a coordinating node may pass another network node, e.g., a radio node.

FIG. 1 shows an example diagram of an evolved UMTS Terrestrial Radio Access Network (EUTRAN) architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 in the RAN referred to in LTE as eNBs or eNodeBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12. An access point (AP) 14 that is part of a WLAN is also shown in FIG. 1, although it will be appreciated that the WLAN and AP 14 are not part of the EUTRAN architecture. As is known in the art, the UE 12 may be capable of aggregating multiple carriers from a single eNB 10 or multiple eNBs 10, and in accordance with certain embodiments, the UE 12 is capable of aggregating a carrier from the LTE network 2 with a carrier from the WLAN AP 14.

Figure 2:
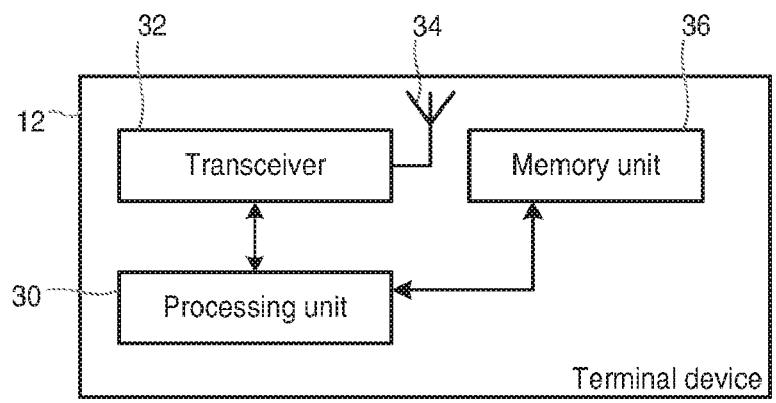
FIG. 2 is a block diagram of a terminal device according to an embodiment.

FIG. 2 shows a terminal device 12 or user equipment (UE) that can be adapted for use in one or more of the non-limiting example embodiments described. The terminal device 12 comprises a processing unit 30 that controls the operation of the terminal device 12. The processing unit 30 is connected to a receiver or a transceiver 32 (which comprises a receiver and a transmitter) with associated antenna(s) 34 which are used to receive signals from or both transmit signals to and receive signals from two different types of radio access network (i.e. two radio access networks that are operating according to different radio access technologies, RATs), such as RAN node 10 in the LTE network 2 and access point (AP) 14 in a WLAN. The terminal device 12 also comprises a memory unit 36 that is connected to the processing unit 30 and that stores computer program code and other information and data required for the operation of the terminal device 12.

Figure 3:
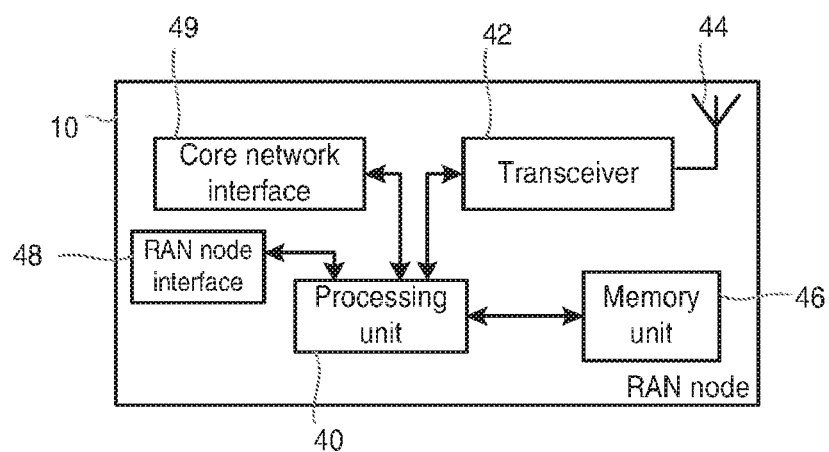
FIG. 3 is a block diagram of a radio access network node according to an embodiment.

FIG. 3 shows a RAN node 10 (for example a base station, NodeB or an eNodeB) that can be adapted for use in example embodiments described. The RAN node 10 comprises a processing unit 40 that controls the operation of the base station 10. The processing unit 40 is connected to a transmitter or a transceiver 42 (which comprises a receiver and a transmitter) with associated antenna(s) 44 which are used to transmit signals to, and receive signals from, terminal devices 12 in the network 2. The RAN node 10 also comprises a memory unit 46 that is connected to the processing unit 40 and that stores computer program code and other information and data required for the operation of the RAN node 10. The RAN node 10 also includes components and/or circuitry 48 for allowing the RAN node 10 to exchange information with other RAN nodes 10 (for example via an X2 interface) and components and/or circuitry 49 for allowing the RAN node 10 to exchange information with nodes in the core network 4 (for example via the S1 interface). It will be appreciated that RAN nodes for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

Figure 4:
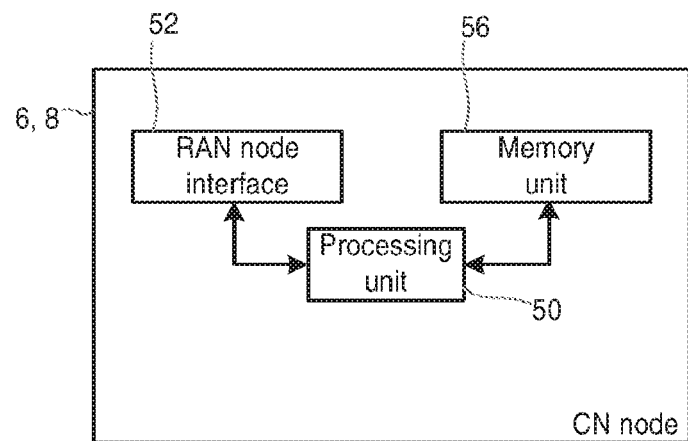
FIG. 4 is a block diagram of a core network node according to an embodiment.

FIG. 4 shows a core network node 6, 8 that can be adapted for use in the example embodiments described. The node 6, 8 comprises a processing unit 50 that controls the operation of the node 6, 8. The processing unit 50 is connected to components and/or circuitry 52 for allowing the node 6, 8 to exchange information with RAN nodes 10 with which it is associated (which is typically via the S1 interface). The node 6, 8 also comprises a memory unit 56 that is connected to the processing unit 50 and that stores computer program code and other information and data required for the operation of the node 6, 8.

Figure 5:
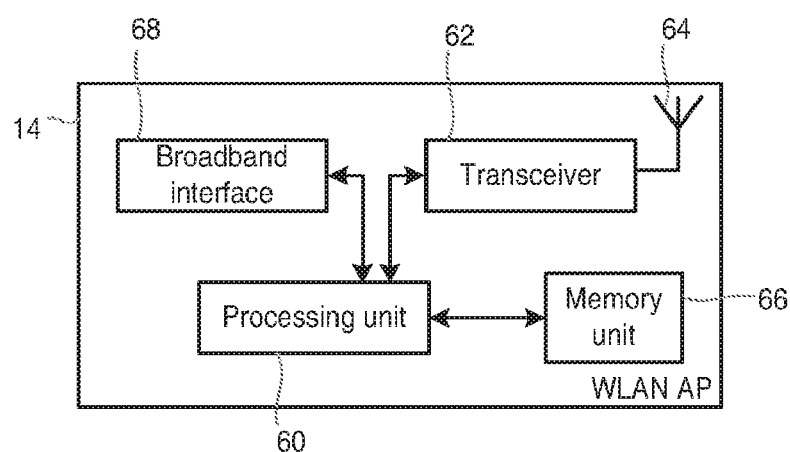
FIG. 5 is a block diagram of a WLAN access point according to an embodiment.

FIG. 5 shows a WLAN AP 14 that can be adapted for use in the example embodiments described. The AP 14 comprises a processing unit 60 that controls the operation of the AP 14. The processing unit 60 is connected to a transmitter or a transceiver 62 (which comprises a receiver and a transmitter) with associated antenna(s) 64 which are used to transmit signals to, and receive signals from, terminal devices 12. The AP 14 also comprises a memory unit 66 that is connected to the processing unit 60 and that stores computer program code and other information and data required for the operation of the AP 14. The AP 14 also includes components and/or circuitry 68 for connecting the AP 14 to a telephone line or other broadband connection.

It will be appreciated that only the components of the terminal device 12, RAN node 10, core network node 6, 8 and AP 14 required to explain the embodiments presented herein are illustrated in FIGS. 2, 3, 4 and 5.

As noted above, 3GPP is currently working on specifying a feature/mechanism for WLAN/3GPP Radio interworking which improves operator control with respect to how a UE performs access selection and traffic steering between 3GPP and WLANs belonging to the operator or its partners. The two main options for performing traffic steering between 3GPP and WLAN networks are described below.

The first option, which is termed a 'threshold based approach' is based on conditions and thresholds provided to the terminal device 12 by a first RAT (e.g. a network operating according to a first RAT, such as a 3GPP-specified RAT or WLAN) which dictates in which situations the terminal device 12 should steer traffic from/to a second RAT (e.g. a network operating according to a second RAT, such as another 3GPP-specified RAT or WLAN). This option is applicable regardless of whether a connection exists between the terminal device 12 and the first RAT, e.g. both when a terminal device 12 is in RRC_CONNECTED mode in 3GPP LTE and when the terminal device 12 is in IDLE mode in LTE.

For example, a rule comprising thresholds and conditions could take the form of Example 1 below where the parameter values threshold1, threshold2, threshold3 and threshold4 are provided to the terminal device 12 by the 3GPP network 2 (i.e. a network node in the 3GPP network 2 such as an eNodeB, NodeB or radio network controller (RNC)).

```
if (3GPP signal < threshold1) && (WLAN signal > threshold2) {
    steerTrafficToWLAN( );
} else if (3GPP signal > threshold3) || (WLAN signal < threshold4) {
    steerTrafficTo3gpp( );
}
```

Example 1

If the 3GPP signal measured by the terminal device 12 is below threshold1 and the WLAN signal measured by the terminal device 12 is above threshold2, the mechanism provides that a timer is started, and if the signals continue to satisfy the thresholds until expiry of the timer, the terminal device 12 steers traffic to WLAN 14. Otherwise, if the 3GPP signal is above threshold3 or the WLAN signal is below threshold4, the timer is started and if the signals continue to satisfy those thresholds the rule provides that the terminal device 12 shall steer traffic to the 3GPP network 2.

The term '3GPP signal' herein could mean the signal transmitted by a radio network node belonging to a 3GPP RAT, e.g. a node in a LTE, HSPA, GSM etc. network, and/or it could be the quality of such a signal. The term 'WLAN signal' herein could mean the signal transmitted by a radio network node belonging to WLAN, e.g. an access point (AP) etc., and/or it could be the quality of such a signal. Examples of measurements of 3GPP signals include are reference signal received power (RSRP) and reference signal received quality (RSRQ) in LTE or common pilot channel (CPICH) received signal code power (RSCP) and CPICH Ec/No in HSPA. Examples of measurements of WLAN signals are Received Signal Strength Indicator (RSSI), Received Channel Power Indicator (RCPI), Received Signal to Noise Indicator (RSNI), etc.

In the second option, which is termed a 'traffic steering command based approach', a first RAT, e.g. a 3GPP RAT (a network operating according to a 3GPP RAT), controls a terminal device's connection to a second RAT, e.g., a WLAN. In a first implementation, the approach provides measurement reporting from the terminal device to the 3GPP network and the 3GPP network sending traffic steering commands that order the terminal device to steer traffic from/to the second RAT. In a second implementation, a traffic steering command may be sent without requiring measurement reporting to be done first (in which case the first RAT evaluates the parameters and/or rules based on information available to the first RAT). To send the traffic steering command it is required that a connection is established between the terminal device 12 and the first RAT, e.g. for a terminal device 12 to be in RRC_CONNECTED mode in 3GPP LTE if LTE should be used in sending traffic steering commands.

Figure 6:
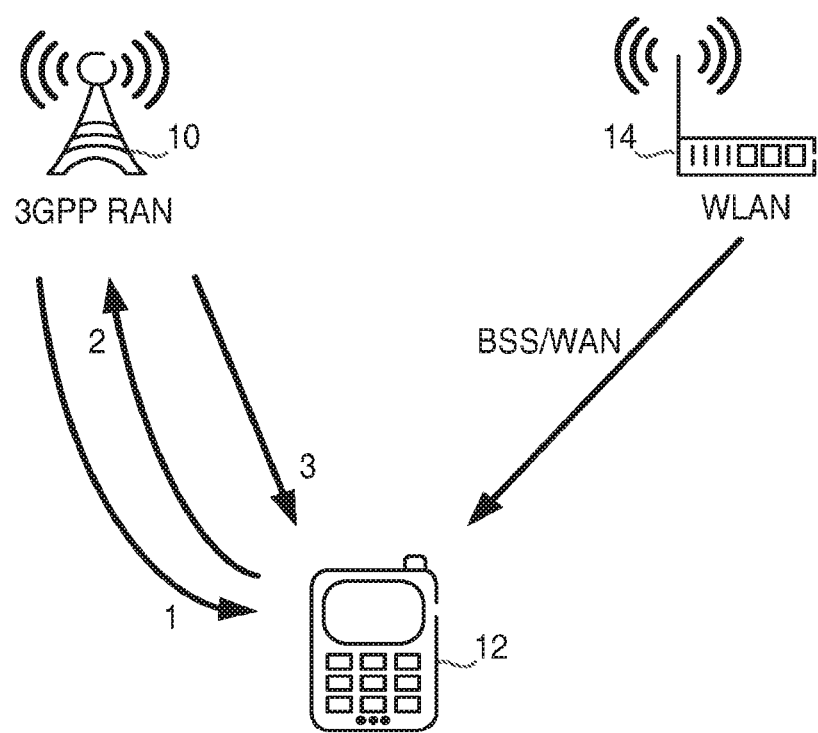
FIG. 6 is a diagram illustrating one example of a network interworking feature.

The first implementation of this approach is based on three messages and some associated procedures that allow the 3GPP network 2 to determine when a terminal device 12 should associate with a WLAN 14 or, more generally, to a network operating according to a second (possibly different) radio access technology (RAT). The procedure is illustrated in FIG. 6. The first message, a reporting configuration message (message 1), is sent from the 3GPP network (3GPP radio access network (RAN) node 10) to the terminal device 12 and configures the terminal device 12 with a set of criteria or parameters (e.g. a set of conditions and/or thresholds) for enabling, detecting, or performing measurements over the second network (WLAN 14).

One possible set of criteria contained in one possible reporting configuration message is as follows:
Received signal strength indicator (RSSI) in WLAN>X
Reference signal received power (RSRP) in 3GPP<Y and/or
BSS load<Z Other metrics that can be considered included RCPI, RSNI, RSRP, uplink (UL) and/or downlink (DL) backhaul rate, etc.

The terminal device 12 subsequently sends a terminal report, message 2, to the 3GPP network 10, when the criteria given in the first message (message 1) have been fulfilled. The 3GPP network 10 evaluates the content of the terminal report, along with any other reports or information that the network 10 may have available, such as backhaul congestion, delay, subscription information and interference, and determines whether or not to steer the terminal device's traffic to WLAN 14. The third message (message 3), a traffic steering message or command, is an indicator sent from the 3GPP network 10 to the terminal device 12 that the terminal device 12 should steer all or a subset of its traffic to WLAN 14. The traffic steering message may indicate a specific target access point (AP) in the WLAN 14, such as a prioritised AP or WLAN or it could just be a command telling the terminal device 12 to steer its traffic to WLAN 14 and the terminal device 12 and WLAN 14 determine which particular AP should be used. The traffic steering message may also indicate which traffic should be steered to WLAN 14 and/or which traffic should be kept in the 3GPP network 10.

In some implementations it is possible that both of the above alternatives can be used. For example the threshold based approach can be used when no connection exists between the terminal device 12 and the controlling RAT and the traffic steering command based approach can be used when a connection exists.

For Release 12, 3GPP has decided to implement a solution similar to the threshold based approach described above, where the RAN provides assistance parameters that helps the UE in taking the access selection and/or traffic steering decision. A general description of the agreed solution for LTE that has been incorporated into the relevant 3GPP specification (3GPP TS 36.300 v12.2.0 (2014 June)—Evolved Universal Terrestrial Radio Access (E-UTRA) and Evolved Universal Terrestrial Radio Access Network (E-UTRAN); Overall description; Stage 2) is set out below. A similar solution has been agreed for UMTS and will be incorporated into the relevant 3GPP specification (3GPP TS 25.300—Universal Terrestrial Radio Access Network (UTRAN); General description; Stage 2):

This section describes the mechanisms to support traffic steering between E-UTRAN and WLAN.

23.6.1    General principles

This version of the specification supports E-UTRAN assisted UE based bi-directional traffic steering between E-UTRAN and WLAN for UEs in RRC_IDLE and RRC_CONNECTED.

E-UTRAN provides assistance parameters via broadcast and dedicated RRC signalling to the UE. The RAN assistance parameters may include E-UTRAN signal strength and quality thresholds, WLAN channel utilization thresholds, WLAN backhaul data rate thresholds, WLAN signal strength and quality thresholds and Offload Preference Indicator (OPI). E-UTRAN can also provide a list of WLAN identifiers to the UE via broadcast signalling. WLANs provided by E-UTRAN may include an associated priority.

The UE uses the RAN assistance parameters in the evaluation of:

- Traffic steering rules defined in TS 36.304 [11]; or

- ANDSF policies defined in TS 24.312 [58]

for traffic steering decisions between E-UTRAN and WLAN as specified in TS 23.402[19].

The OPI is only used in ANDSF policies as specified in TS 24.312 [58].

WLAN identifiers are only used in traffic steering rules defined in TS 36.304 [11].

If the UE is provisioned with ANDSF policies it shall forward the received RAN

> assistance parameters to upper layers, otherwise it shall use them in the traffic steering rules defined in section 23.6.2 and TS 36.304 [11]. The traffic steering rules defined in section 23.6.2 and TS 36.304 [11] are applied only to the WLANs of which identifiers are provided by the E-UTRAN.
>
> The UE in RRC_CONNECTED shall apply the parameters obtained via dedicated signalling if such have been received from the serving cell; otherwise, the UE shall apply the parameters obtained via broadcast signalling.
>
> The UE in RRC_IDLE shall keep and apply the parameters obtained via dedicated signalling, until cell reselection or a timer has expired since the UE entered RRC_IDLE upon which the UE shall apply the parameters obtained via broadcast signalling.
>
> In the case of RAN sharing, each PLMN sharing the RAN can provide independent sets of RAN assistance parameters.
>
> 23.6.2  Access network selection and traffic steering rules
>
> The UE indicates to upper layers when (and for which WLAN identifiers along with associated priorities, if any) access network selection and traffic steering rules defined in TS 36.304 [11] are fulfilled. The selection among WLAN APs that fulfil the access network selection and traffic steering rules is up to UE implementation.
>
> When the UE applies the access network selection and traffic steering rules defined in TS 36.304 [11], it performs traffic steering between E-UTRAN WLAN with APN granularity.
>
> User preference takes precedence (FFS whether it does not apply to particular scenarios).

An exemplary set of access network selection and/or traffic steering rules and parameters is shown below. This text is not yet finalised, and may be modified before it is incorporated into a specification. In the case of LTE, it will be included in 3GPP TS 36.304 - Evolved Universal Terrestrial Radio Access (E-UTRA); User Equipment (UE) procedures in idle mode. A similar set of rules and parameters will be finalised for UMTS and will be added to 3GPP TS 25.304 - User Equipment (UE) procedures in idle mode and procedures for cell reselection in connected mode.

5.x Access network selection and traffic steering between E-UTRAN and WLAN

5.x.1 RAN assistance parameter handling in RRC_IDLE

RAN assistance parameters may be provided to the UE in *SystemInformationBlockType17* or in the *RRCConnectionReconfiguration* message. RAN assistance parameters received in *SystemInformationBlockType17* are valid only if the UE is camped on a suitable cell.

The UE shall discard the RAN assistance parameters upon cell reselection. Upon T350 expiry, the UE shall discard the RAN assistance parameters received in the *RRCConnectionReconfiguration* message and apply the RAN assistance parameters received in *SystemInformationBlockType17*.

The upper layers in the UE shall be notified whenever changes in the current RAN assistance parameters occur.

5.x.2 Access network selection and traffic steering rules

The rules in this sub-clause are only applicable for a WLAN for which an identifier has been signaled to the UE by E-UTRAN and the UE is capable of traffic steering between E-UTRAN and WLAN. Coexistence with ANDSF based WLAN selection and traffic steering methods on the UE is based on mechanism described in TS 23.402 [x1]. The rules refer to the following quantities:

> Editor's note: "UE is capable of traffic steering between E-UTRN and WLAN" should be replaced with a name for this feature

| | |
|---|---|
| ChannelUtilizationWLAN | WLAN channel utilization as defined in subclause 8.4.2.30 in [x2]. |
| BackhaulRateDlWLAN | WLAN DLBandwidth as defined in subclause 9.1.2 in [x3]. |
| BackhaulRateUlWLAN | WLAN ULBandwidth as defined subclause 9.1.2 in in [x3]. |
| RCPI | WLAN RCPI as defined in subclause 8.4.2.40 in [x2]. |
| RSNI | WLAN RSNI as defined in subclause 8.4.2.43 in [x2]. |
| RSRPmeas | Qrxlevmeas in RRC IDLE, and PCell RSRP in RRC CONNECTED as defined in TS 36.331 [3]. |
| RSRQmeas | Qqualmeas in RRC IDLE, and PCell RSRQ in RRC CONNECTED as defined in TS 36.331 [3]. |

The upper layers in the UE shall be notified when and for which WLAN identifiers (out of the list in RAN parameters in subclause 5.x.3) the following conditions 1 and 2 for steering traffic from E-UTRAN to WLAN are satisfied for a time interval $Tsteering_{WLAN}$:

1. In the E-UTRAN serving cell:

$RSRPmeas < Thresh_{ServingOffloadWLAN, LowP}$; or $\text{RSRQmeas} < \text{Thresh}_{\text{ServingOffloadWLAN, LowQ}};$ 2. In the target WLAN:

$\text{ChannelUtilizationWLAN} < \text{Thresh}_{\text{ChUtilWLAN, Low}};$ and $\text{BackhaulRateDlWLAN} > \text{Thresh}_{\text{BackhRateDLWLAN, High}};$ and $\text{BackhaulRateUlWLAN} > \text{Thresh}_{\text{BackhRateULWLAN, High}};$ and $\text{RCPI} > \text{Thresh}_{\text{RCPIWLAN, High}};$ and $\text{RSNI} > \text{Thresh}_{\text{RSNIWLAN, High}};$ The UE shall exclude the evaluation of a measurement for which a threshold has not been provided. The UE shall evaluate the E-UTRAN conditions on PCell only. If not all metrics related to the provided thresholds can be acquired for a WLAN, the UE shall exclude that WLAN from the evaluation of the above rule.

The notification to the upper layers shall also include the priorities for the WLAN identifiers if provided by the E-UTRAN.

The upper layers in the UE shall be notified when the following conditions 3 or 4 for steering traffic from WLAN to E-UTRAN are satisfied for a time interval $\text{Tsteering}_{\text{WLAN}}$:

3. In the source WLAN:

$\text{ChannelUtilizationWLAN} > \text{Thresh}_{\text{ChUtilWLAN, High}};$ or $\text{BackhaulRateDlWLAN} < \text{Thresh}_{\text{BackhRateDLWLAN, Low}};$ or $\text{BackhaulRateUlWLAN} < \text{Thresh}_{\text{BackhRateULWLAN, Low}};$ or $\text{RCPI} < \text{Thresh}_{\text{RCPIWLAN, Low}};$ or $\text{RSNI} < \text{Thresh}_{\text{RSNIWLAN, Low}};$ 4. In the target E-UTRAN cell:

$\text{RSRPmeas} > \text{Thresh}_{\text{ServingOffloadWLAN, HighP}};$ and $\text{RSRQmeas} > \text{Thresh}_{\text{ServingOffloadWLAN, HighQ}};$ The UE shall exclude the evaluation of a measurement for which a threshold has not been provided. The UE shall evaluate the E-UTRAN conditions on PCell only.

5.x.3    RAN assistance parameters definition

The following RAN assistance parameters for access network selection and traffic steering between E-UTRAN and WLAN may be provided:

Thresh$_{\text{ServingOffloadWLAN, LowP}}$

This specifies the RSRP threshold (in dBm) used by the UE for traffic steering to from E-UTRAN to WLAN.

Thresh$_{\text{ServingOffloadWLAN, HighP}}$

This specifies the RSRP threshold (in dBm) used by the UE for traffic steering from WLAN to E-UTRAN.

Thresh$_{\text{ServingOffloadWLAN, LowQ}}$

This specifies the RSRQ threshold (in dB) used by the UE for traffic steering from E-UTRAN to WLAN.

Thresh$_{\text{ServingOffloadWLAN, HighQ}}$

This specifies the RSRQ threshold (in dB) used by the UE for traffic steering from WLAN to E-UTRAN.

Thresh$_{\text{ChUtilWLAN, Low}}$

This specifies the WLAN channel utilization (BSS load) threshold used by the UE for traffic steering from E-UTRAN to WLAN.

Thresh$_{\text{ChUtilWLAN, High}}$

This specifies the WLAN channel utilization (BSS load) threshold used by the UE for traffic steering from WLAN to E-UTRAN.

Thresh$_{\text{BackhRateDLWLAN, Low}}$

This specifies the backhaul available downlink bandwidth threshold used by the UE for traffic steering from WLAN to E-UTRAN.

Thresh$_{\text{BackhRateDLWLAN, High}}$

This specifies the backhaul available downlink bandwidth threshold used by the UE for traffic steering from E-UTRAN to WLAN.

Thresh$_{\text{BackhRateULWLAN, Low}}$

This specifies the backhaul available uplink bandwidth threshold used by the UE for traffic steering from WLAN to E-UTRAN.

Thresh$_{\text{BackhRateULWLAN, High}}$

This specifies the backhaul available uplink bandwidth threshold used by the UE for traffic steering from E-UTRAN to WLAN.

Thresh$_{\text{RCPIWLAN, Low}}$

This specifies the RCPI threshold used by the UE for traffic steering from WLAN to E-UTRAN.

Thresh$_{\text{RCPIWLAN, High}}$

This specifies the RCPI threshold used by the UE for traffic steering from E-UTRAN to WLAN.

Thresh$_{\text{RSNIWLAN, Low}}$

This specifies the RSNI threshold used by the UE for traffic steering from WLAN to E-UTRAN.

Thresh$_{\text{RSNIWLAN, High}}$

This specifies the RSNI threshold used by the UE for traffic steering from E-UTRAN to WLAN.

Tsteering$_{\text{WLAN}}$

This specifies the timer value Tsteering$_{\text{WLAN}}$ during which the rules should be fulfilled before starting traffic steering between E-UTRAN and WLAN.

WLAN identifiers

Only the SSIDs, BSSIDs or HESSIDs which are provided in this parameter shall be considered for traffic steering between E-UTRAN and WLAN based on the rules in this subclause.

WLAN priorities

WLAN priorities may be provided for WLANs included in the WLAN identifiers.

An exemplary set of access network selection and/or traffic steering rules and parameters is shown below. This text is not yet finalised, and may be modified before it is incorporated into a specification. In the case of LTE, it will be included in 3GPP TS 36.304—Evolved Universal Terrestrial Radio Access (E-UTRA); User Equipment (UE) procedures in idle mode. A similar set of rules and parameters will be finalised for UMTS and will be added to 3GPP TS 25.304—User Equipment (UE) procedures in idle mode and procedures for cell reselection in connected mode.

As seen above, in this mechanism the terminal device 12 applies a timer (Tsteering$_{WLAN}$) when the parameters and/or rules are satisfied. When the parameters and/or rules have been fulfilled for a time Tsteering$_{WLAN}$ the terminal device 12 shall indicate to higher layers (in the terminal device 12) that traffic steering shall be executed and procedures in higher layers are then used to execute the traffic steering.

As noted above, a problem exists with the use of the timer in the agreed mechanism, and the alternative techniques described above, in that it is possible that, once the timer is started in response to the parameters and/or rules being met, the parameters and/or rules may change or be updated while the timer is running (i.e. before the timer expires). If the timer is allowed to continue running, it may be that the terminal device 12 executes the change in access network or traffic steering earlier than configured by the network. This use of the timer may result in ping-ponging of the terminal device 12 between the RATs, which impairs user experience due to interruptions, increases signalling overhead, and also leads to terminal device 12 behaviour that is not expected by the network.

Therefore, the techniques described herein provide that the operation of the timer is adjusted when there are new or updated parameters and/or rules or where new or updated parameters and/or rules may be expected to be received. In this way, the risk of undesirable behaviour from the terminal device 12 is reduced.

Although the techniques are primarily described with reference to access network selection and/or traffic steering between a 3GPP network and a WLAN, it will be appreciated that the techniques are more broadly applicable to access network selection and/or traffic steering between any two networks that are operating according to different radio access technologies (e.g. between a 3GPP network and a non-3GPP network other than WLAN, such as Worldwide Interoperability for Microwave Access (WiMAX), or between two different 3GPP networks). Moreover, it will be appreciated that the techniques can also be used in extended access network selection and/or traffic steering mechanisms that determine whether a terminal device can aggregate carriers across the multiple networks (e.g. aggregate a carrier in 3GPP and a carrier in WLAN for a particular traffic flow (e.g. video stream)).

As noted below, the techniques described herein can be applied to either of the threshold-based and traffic steering command-based approaches described above, as well as to other approaches in which parameters and/or rules are evaluated in order to take an access network selection and/or traffic steering and/or aggregation decision and the parameters and/or rules are required to be satisfied for a predetermined time period before the decision is implemented.

Figure 7:
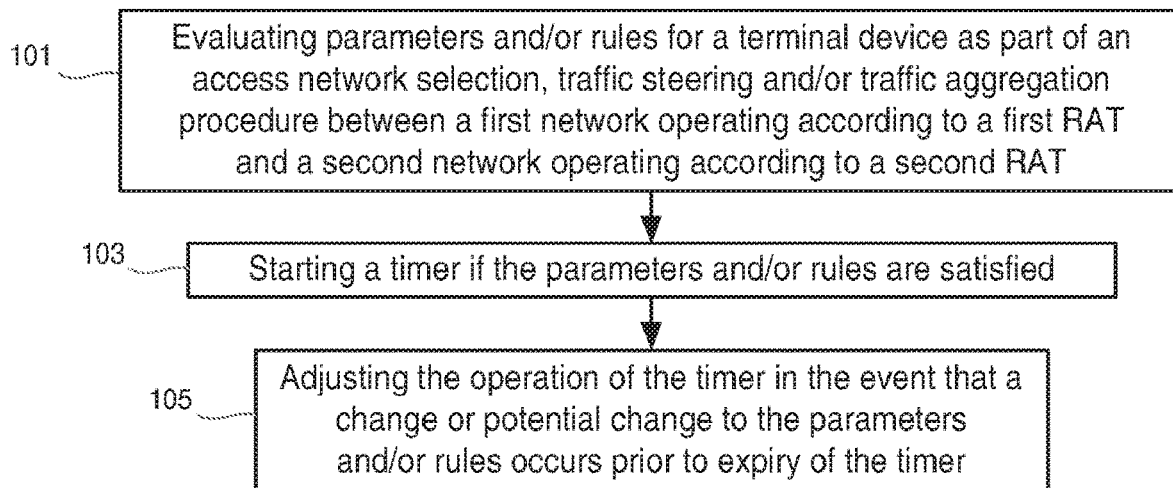
FIG. 7 illustrates a method of operating an apparatus according to an embodiment.

A method of operating an apparatus in a first network operating according to a first RAT is shown in FIG. 7. Depending on the specific implementation, the apparatus may be the terminal device 12 or a node in the first network (e.g. a node in the RAN, such as an eNB 10, or a node in the core network, such as an MME where the first network is a 3GPP network, or a WLAN AP 14 where the first network is a WLAN).

In a first step of the method, step 101, the apparatus evaluates parameters and/or rules as part of an access network selection and/or traffic steering and/or traffic aggregation procedure for a particular terminal device 12 with respect to the first network (e.g. 3GPP network) and/or a second network that is operating according to a second (different) RAT (e.g. WLAN).

In some implementations this step can comprise making measurements of signals from the first network and/or second network, determining values for one or more signal-related parameters, and comparing the values to the parameters and/or rules (where the parameters can comprise threshold values and/or conditions) to determine if the parameters and/or rules have been satisfied. In other implementations this step can comprise receiving values for one or more signal-related parameters from a terminal device and comparing the values to the parameters and/or rules to determine if the parameters and/or rules have been satisfied.

In some embodiments the signal-related parameters can comprise, for example, any of reference signal received power (RSRP) and reference signal received quality (RSRQ) in LTE or common pilot channel (CPICH) received signal code power (RSCP) and CPICH Ec/No in HSPA, Received Signal Strength Indicator (RSSI), Received Channel Power Indicator (RCPI) or Received Signal to Noise Indicator (RSNI) in Wi-Fi.

Then, in step 103, a timer is started if the parameters and/or rules are satisfied. In other words, a timer is started if the evaluation of the parameters and/or rules in step 101 indicates that the terminal device 12 that is associated with one or both of the first network and second network (where 'associated with' means that the terminal device 12 is authenticated with or otherwise connected to) is to access the other network (i.e. the one of the first and second network that the terminal device 12 is not currently accessing) and/or steer traffic to the other network and/or aggregate traffic across the first and second network (e.g. split a particular traffic flow, service, bearer or application across a carrier in each of the first network and second network). As indicated above, in the case of the 3GPP-agreed access network selection and/or traffic steering mechanism, the timer or predetermined time period is denoted Tsteering$_{WLAN}$.

Next, if an event occurs prior to expiry of the timer that changes any of the parameters and/or rules evaluated in step 101, or that may potentially change any of the parameters and/or rules evaluated in step 101, the operation of the timer is adjusted (step 105).

Adjusting the operation of the timer can comprise any action that results in the timing of the implementation of the access network selection and/or traffic steering and/or traffic aggregation decision from step 101 being different to allowing the timer to continue unadjusted. This adjustment of the operation of the timer reduces the occurrence of ping-ponging of the terminal device 12 between the RATs, which reduces the chance of impairing the user experience due to interruptions, avoids additional signalling overhead, and also reduces the risk of terminal device 12 behaviour that is not expected by the network.

In particular embodiments, adjusting the operation of the timer can comprise any of: stopping the timer (which can include stopping the timer so that it cannot be resumed later), disabling the timer, suspending or pausing the timer (which can include pausing the timer so that it can be resumed from the paused value later), and restarting the timer (which can include resetting the elapsed time to zero or resetting the timer to the initial value).

For example, if the terminal device 12 has evaluated a rule in step 101 and determined that according to current parameters the conditions for steering traffic to a WLAN are fulfilled, the terminal device 12 should then perform traffic steering to the WLAN after the conditions have been fulfilled for a time $Tsteering_{WLAN}$. However, the terminal device 12 may, before $Tsteering_{WLAN}$ has expired, receive updated parameters from the 3GPP network. According to the techniques described herein, the terminal device 12 would in that case stop, suspend, disable or restart the timer $Tsteering_{WLAN}$ (step 105).

As described in more detail below, a change in the parameters and/or rules can be signalled to the apparatus by the first network (e.g. 3GPP network) or second network (e.g. WLAN). The change in the parameters and/or rules may be signalled to the apparatus from a node in the first network (e.g. eNB 10 or MME 6) or a node in the second network (e.g. WLAN AP 14), and, in the case that the apparatus is the terminal device 12, may be communicated to the terminal device 12 via broadcast or dedicated signalling.

A change in the parameters and/or rules might occur as the conditions (e.g. load) in the first and/or second network change (in which case a network may change the parameters in the access network selection and/or traffic steering and/or traffic aggregation mechanism in order to encourage more traffic to a particular network). In this case, step 105 can be performed on receipt of the new or updated parameters and/or rules.

A change in the parameters and/or rules may also occur if the particular parameters and/or rules to be evaluated in step 101 are changed (i.e. changed to different ones of previously received or determined parameters and/or rules). For example, only a subset of a set of parameters and/or rules may be evaluated as part of the access network selection and/or traffic steering and/or traffic aggregation procedure in step 101, and it is possible that the subset of parameters and/or rules to be evaluated can be changed over time. One example where this may occur is in carrier aggregation where there are sets of parameters and/or rules for each carrier that is being aggregated by a terminal device, and all sets are received when the aggregation starts. A particular set of parameters and/or rules (e.g. for one carrier) is selected for evaluation in step 101, but subsequently the selected set is changed (e.g. as the particular aggregated carriers change). This change in the evaluated parameters and/or rules will result in the adjustment of the operation of the timer in step 105.

A change in the parameters and/or rules may also occur following a change in the serving cell of the terminal device 12 (e.g. following a handover or cell reselection) if the serving cells have different parameter values (and/or rules) to each other. Parameters and/or rules for a new serving cell of a terminal device 12 may not be signalled to a terminal device 12 or other apparatus as soon as the terminal device 12 starts being served by the new cell, and may take some time to be communicated. This is particularly the case where the parameters and/or rules are communicated in a system information broadcast (SIB) message, since a terminal device 12 may not read the SIB very frequently. Therefore, in some embodiments the occurrence of a handover or reselection event at the terminal device 12 can be used as a trigger for adjusting the operation of the timer in step 105 (i.e. since a handover or cell reselection event indicates that there is a potential change to the parameters and/or rules).

In some embodiments, the step of adjusting (step 105) is performed whenever the parameters and/or rules used for the terminal device 12 are updated or changed.

In other embodiments, the step of adjusting (step 105) is performed whenever the parameters and/or rules used for the terminal device 12 are updated or changed and the updated or changed parameters and/or rules are different from the previous parameters and/or rules (the ones evaluated in step 101) or different by more than a threshold amount. This embodiment can further comprise the steps of performing a comparison of the updated parameters and/or rules and the evaluated parameters and/or rules and, where some difference in the parameters and/or rules is permitted, comparing the differences in the parameters and/or rules to one or more thresholds. The result of the comparison of the differences is then used to determine whether to adjust the operation of the timer. If the differences in the parameters and/or rules is less than the threshold (e.g. the parameters and/or rules are identical), then the timer can be allowed to continue.

For example, the value for an RSRP threshold provided in the updated parameters and/or rules and the value for the RSRP threshold provided in the evaluated parameters and/or rules are compared, and the difference in the threshold values compared to a threshold to determine if the difference is too significant to allow the timer to continue running and the access network selection and/or traffic steering and/or traffic aggregation to be implemented.

In some embodiments, after the operation of the timer is adjusted following a cell change by the terminal device 12 (e.g. the timer is suspended or paused), the new parameters and/or rules for the new serving cell can be compared to the previous parameters and/or rules (once the new parameters and/or rules are received). If the new parameters and/or rules are identical to the previous parameters and/or rules, or differ by less than a threshold, then the method can further comprise the step of resuming the timer (i.e. restarting the timer from the point that it was suspended or paused). A benefit of this embodiment is that if the terminal device 12 is moving between two cells for which the parameters are identical (or which differ by less than a threshold), it might not be suitable for the terminal device 12 to restart the timer from the beginning (which may occur as soon as the new parameters and/or rules are evaluated) as this will delay the implementation of the access network selection and/or traffic steering and/or traffic aggregation decision. This is especially true for cases where the timer duration is configured to be quite long. If the parameters and/or rules are not identical, or not within the threshold amount of each other, the timer could be left in the suspended or paused state, or it could be stopped or disabled to prevent or abort the previous decision on access network selection and/or traffic steering and/or aggregation from being implemented.

In another embodiment, after a serving cell change and before any updated parameters and/or rules are received, the timer can be allowed to continue running. However, if the timer expires prior to updated parameters and/or rules being received, the implementation of the access network selection and/or traffic steering and/or traffic aggregation decision can be prevented (i.e. aborted) or delayed. Once the updated parameters and/or rules are received, they can be compared to the previous parameters and/or rules as described for the above embodiments, and if they are identical (or within a threshold amount), then the previously determined decision can be implemented. If they are not identical or within the threshold amount, the determined decision can be cancelled (i.e. not implemented).

Figure 8:
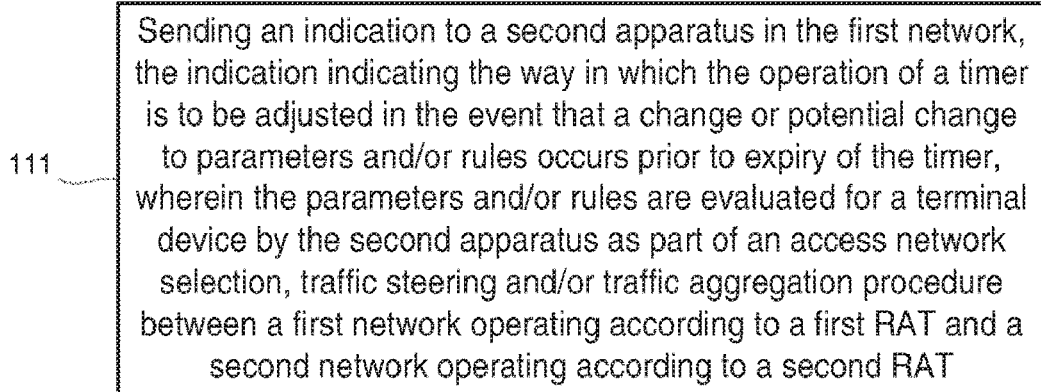
FIG. 8 illustrates a method of operating a network node according to an embodiment.

In some embodiments, the particular way in which the operation of the timer is to be adjusted in step 105 is preconfigured in the apparatus. In some embodiments, the apparatus may be preconfigured to adjust the operation of the timer differently depending on the cause for the change in the parameters and/or rules (e.g. due to cell change, etc.). In other embodiments, the apparatus may receive an indication from a network node in the network that indicates the way in which the operation of the timer is to be adjusted. This is illustrated in FIG. 8. Thus, in step 111, an indication is sent from the network node to the apparatus that is, or is to, perform the access network selection and/or traffic steering and/or traffic aggregation procedure, the indication indicating the way in which the operation of the timer is to be adjusted in the event that there is a change or potential change in the parameters and/or rules that are evaluated as part of the procedure. In some embodiments, the indication may indicate the way in which the operation of the timer is adjusted for different causes for the change in the parameters and/or rules (e.g. perform one type of adjustment on cell change and a different type of adjustment when the network updates the parameters and/or rules). Alternatively, multiple indications can be provided, each indicating the way in which the operation of the timer is adjusted for a particular cause in for the change in the parameters and/or rules. In some embodiments, the indication may also indicate the reasons or events for which the operation of the timer is to be adjusted (e.g. cell change).

Upon receiving an indication from the network the comparison described in this context above may also consist of the terminal only evaluating/comparing an old configuration with a new if the indication from the NW indicates, "continue" e.g. while a timer is running. The terminal may upon this indication from network, continue using the stored parameters of a (previous) configuration in the same cell.

The indication in this context may be included as part of, or otherwise related to, new parameters/configuration in either system information or dedicated signalling.

It will be appreciated that the apparatus may only consider the parameters and/or rules to have changed and thus trigger an adjustment to the operation of the timer if certain ones of the parameters or rules have changed. For example, the parameters and/or rules may not be considered to have changed within the meaning of step 105 if, for example, only parameters such as identifiers for the access points (e.g. WLAN identifiers) that are used in the access network selection and/or traffic steering and/or traffic steering procedure have changed. In some embodiments, the parameters and/or rules may only be considered to have changed if one or more of the thresholds and/or conditions have changed (or changed by more than a threshold amount).

In some embodiments the apparatus can consider the current state of the terminal device 12 with respect to the second network (e.g. is the terminal device steering traffic to the second network) when evaluating whether to adjust the operation of the timer (e.g. stop, restart or suspend the timer). For example, the timer may be stopped, restarted or suspended only if the terminal device 12 is not currently steering traffic to the second network (e.g. WLAN), but if the terminal device has traffic carried over the second network the operation of the timer would not be adjusted.

After taking a decision to access one of the first and second network, to steer traffic to one of the first and second network, or to aggregate a traffic flow over both networks, and on expiry of the timer, the method in FIG. 7 further comprises the step of implementing that decision and causing the terminal device 12 to steer traffic to one of the first and second network, or to aggregate a traffic flow over both networks as appropriate. In implementations where the apparatus is the terminal device 12, this step can comprise the terminal device 12 establishing (or maintaining) the appropriate connections to the first and/or second networks and sending and/or receiving the appropriate traffic over that or those networks. In implementations where the apparatus is a network node 10, 14, this step can comprise sending a traffic steering command or other signal to the terminal device 12 instructing the terminal device 12 to establish (or maintain) the appropriate connections to the first and/or second networks.

In the implementations where the apparatus is the terminal device 12, prior to step 101, the method can further comprise the step of receiving the parameters and/or rules from a network node 10, 14 in a network with which the terminal device 12 is associated. Thus, the terminal device 12 can receive the parameters and/or rules from an eNB 10 in the 3GPP network 2 and/or from a Wi-Fi AP 14. In this implementation the method can also comprise the step of measuring signals from the first network and/or second network (and determining values of one or more parameters from the measured signals) and the step of evaluating (step 101) comprises comparing the measurements or values to thresholds and/or conditions in the received parameters and/or rules.

In the implementations where the apparatus is a network node 10, 14, the method can further comprise determining the parameters and/or rules that are to be evaluated in step 101, and sending the parameters and/or rules to the terminal device 12. In some embodiments the rules can be specified in a standard (e.g. a 3GPP standard), whereas in other embodiments the rules can be preconfigured by the network operator or dynamically determined based on, for example, the load in the first and/or second network. The method can further comprise receiving measurements of signals from the first network and/or second network from the terminal device 12, or receiving parameter values derived from measurements of signals received at the terminal device 12.

Figure 9:
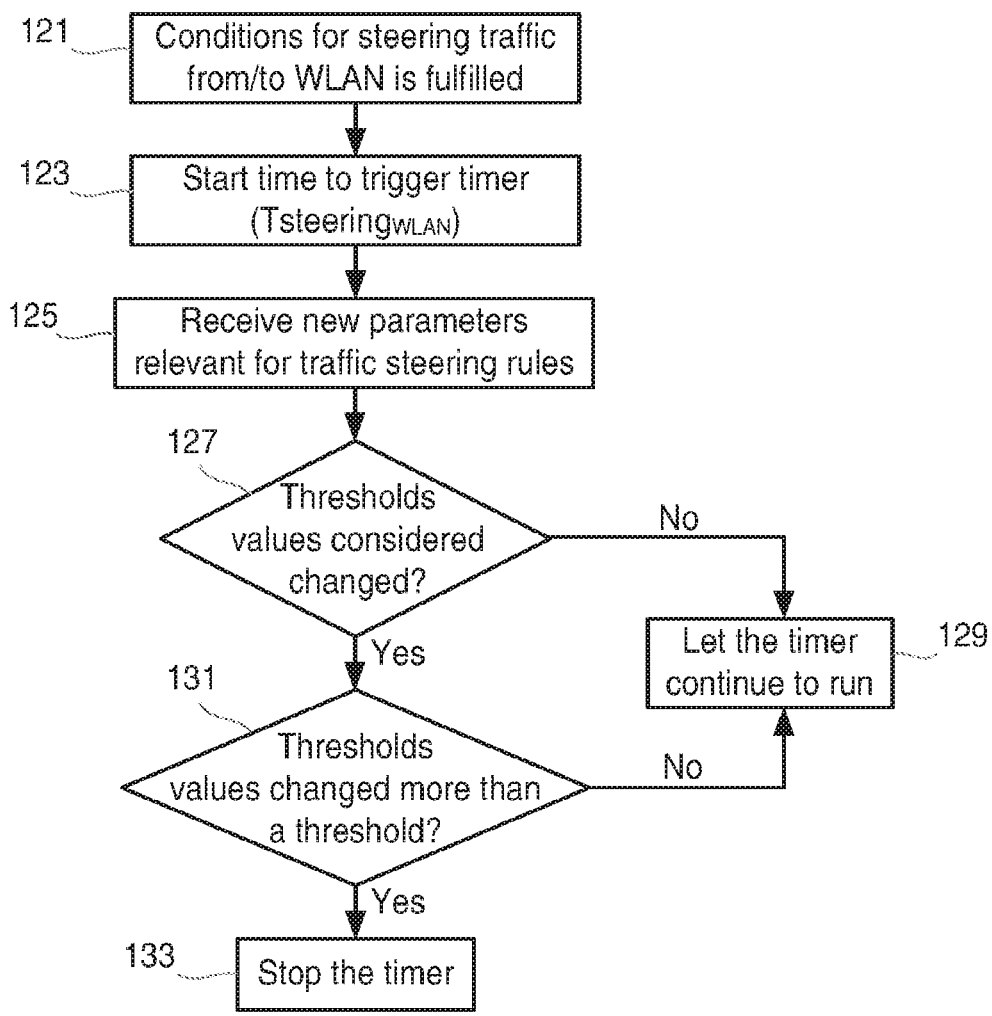
FIG. 9 illustrates a method of operating an apparatus according to a specific embodiment.

The flow chart in FIG. 9 illustrates a specific method of operating an apparatus according to the techniques described herein. In this method, the second network is a WLAN. In a first step, step 121, parameters and/or rules comprising thresholds and conditions are evaluated and found to be fulfilled so traffic can be steered to WLAN. As the conditions are fulfilled, the time-to-trigger timer (having duration $Tsteering_{WLAN}$) is started.

At some time prior to the expiry of $Tsteering_{WLAN}$, new parameters (specifically new threshold values) relevant to the traffic steering parameters and/or rules are received (step 125). The new thresholds are compared to the previous thresholds to determine if the thresholds are considered to have changed (step 127).

If the threshold values are not considered to have changed (e.g. they are identical), then the timer is allowed to continue running (step 129), and if the timer expires with the conditions for traffic steering remaining fulfilled, the steering of traffic to WLAN is performed.

If the threshold values are considered to have changed, then it is determined if the threshold values have changed by more than a threshold (step 131). If they have not changed by more than a threshold, the timer is allowed to continue running (step 129). If they have changed by more than a threshold, the timer is stopped (step 133) and the traffic is not steered to WLAN. It will be appreciated that there may be a single threshold that is used for each threshold value (e.g. a threshold percentage change, e.g. 10%), or there may be a respective change threshold for each threshold value (e.g. there may be one threshold for changes in RSSI and another, different threshold, for changes in BSS load).

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a first apparatus in a first network that operates according to a first radio access technology (RAT), the method comprising:
sending an indication to a second apparatus in the first network, the indication indicating a process of adjusting operation of a timer in response to that a change or potential change to parameters and/or rules occurs prior to expiry of the timer, wherein:
the indication is used by the second apparatus to perform the process of adjusting the operation of the time; and
the parameters and/or rules are evaluated by the second apparatus for a terminal device as part of an access network selection, traffic steering and/or traffic aggregation procedure between the first network and a second network, the second network operating according to a second RAT.

2. The method according to claim 1, wherein the indication indicates that the process of adjusting the operation of the timer comprises one or more of:
stopping the timer, suspending the timer, disabling the timer, restarting the timer, and resetting the timer.

3. The method according to claim 1, wherein the indication indicates that the process of adjusting the operation of the timer comprises:
adjusting the operation of the timer in response to that the parameters and/or rules are updated prior to expiry of the timer.

4. The method according to claim 1, wherein the indication indicates that the process of adjusting the operation of the timer comprises:
adjusting the operation of the timer in response to that:
the parameters and/or rules are updated prior to expiry of the timer, and
the updated parameters and/or rules differ from the evaluated parameters and/or rules by more than a threshold.

5. The method according to claim 1, wherein the indication indicates that the process of adjusting the operation of the timer comprises:
adjusting the operation of the timer in response to that the terminal device changes cell prior to expiry of the timer.

6. The method according to claim 5, wherein the indication indicates that the process of adjusting the operation of the timer comprises:
stopping or suspending the timer.

7. The method according to claim 6, wherein the indication indicates that the process of adjusting the operation of the timer comprises:
resuming the timer if the updated parameters and/or rules are identical to the evaluated parameters and/or rules.

8. The method according to claim 7, wherein the indication indicates that the process of adjusting the operation of the timer comprises:
stopping or disabling the timer if the updated parameters and/or rules are not identical to the evaluated parameters and/or rules.

9. The method according to claim 6, wherein the indication indicates that the process of adjusting the operation of the timer comprises:
resuming the timer if the updated parameters and/or rules are within a threshold of the evaluated parameters and/or rules.

10. The method according to claim 9, wherein the indication indicates that the process of adjusting the operation of the timer comprises:
stopping or disabling the timer if the updated parameters and/or rules are not within the threshold of the evaluated parameters and/or rules.

11. The method according to claim 6, wherein the indication indicates that the process of adjusting the operation of the timer comprises:
allowing the timer to continue but preventing or aborting implementation of a result of the evaluation of the access network selection, traffic steering and/or traffic aggregation procedure upon expiry of the timer if updated parameters and/or rules have not been received.

12. The method according to claim 11, wherein the indication indicates that the process of adjusting the operation of the timer comprises:
implementing the result of the evaluation of the access network selection, traffic steering and/or traffic aggregation procedure upon expiry of the timer if the updated parameters and/or rules are identical to the evaluated parameters and/or rules; and
discarding or aborting the result of the evaluation of the access network selection, traffic steering and/or traffic aggregation procedure if the updated parameters and/or rules are not identical to the evaluated parameters and/or rules.

13. The method according to claim 11, wherein the indication indicates that the process of adjusting the operation of the timer comprises:
implementing the result of the evaluation of the access network selection, traffic steering and/or traffic aggregation procedure upon expiry of the timer if the updated parameters and/or rules are within a threshold of the evaluated parameters and/or rules; and
discarding or aborting the result of the evaluation of the access network selection, traffic steering and/or traffic aggregation procedure if the updated parameters and/or rules are not within the threshold of the evaluated parameters and/or rules.

14. The method according to claim 1, wherein the indication indicates that the process of adjusting the operation of the timer comprises:
performing at least one of stopping the timer, suspending the timer, disabling the timer, restarting the timer, and resetting the timer, only if the terminal device is not steering traffic to the second network.

15. The method according to claim 1, wherein the timer is a $Tsteering_{WLAN}$ timer.

16. The method according to claim 1, wherein the first apparatus is a network node in the first network.

17. The method according to claim 1, wherein the second apparatus is the terminal device.

18. A first apparatus for use in a first network that operates according to a first radio access technology (RAT), the first apparatus comprising:
communication circuitry configured to communicate with a second apparatus in the first network; and
a processor coupled to the communication circuitry, the processor being configured to:
send, via the communication circuitry, an indication to the second apparatus, the indication indicating a process of adjusting operation of a timer in response to that a change or potential change to parameters and/or rules occurs prior to expiry of the timer, wherein:
the indication is used by the second apparatus to perform the process of adjusting the operation of the time; and
the parameters and/or rules are evaluated by the second apparatus for a terminal device as part of an access network selection, traffic steering and/or traffic aggregation procedure between the first network and a second network, the second network operating according to a second RAT.

19. The first apparatus according to claim 18, wherein the indication indicates that the process of adjusting the operation of the timer comprises one or more of:
stopping the timer, suspending the timer, disabling the timer, restarting the timer, and resetting the timer.

20. The first apparatus according to claim 18, wherein the indication indicates that the process of adjusting the operation of the timer comprises:
adjusting the operation of the timer in response to that:
the parameters and/or rules are updated prior to expiry of the timer, and
the updated parameters and/or rules differ from the evaluated parameters and/or rules by more than a threshold.

* * * * *